US008149232B2

(12) United States Patent
Lin et al.

(10) Patent No.: US 8,149,232 B2
(45) Date of Patent: Apr. 3, 2012

(54) SYSTEMS AND METHODS FOR GENERATING REFERENCE VOLTAGES

(75) Inventors: Ching-Wei Lin, Tao-Yuan Hsien (TW); Chueh-Kuei Jan, Taipei (TW); Meng-Hsun Hsieh, Tai-Chung (TW)

(73) Assignee: Chimei Innolux Corporation, Chu-Nan Site, Hsinchu Science Park, Chu-Nan, Miao-Li County (TW)

( * ) Notice: Subject to any disclaimer, the term of this patent is extended or adjusted under 35 U.S.C. 154(b) by 335 days.

(21) Appl. No.: 12/687,894

(22) Filed: Jan. 15, 2010

(65) Prior Publication Data

US 2010/0110060 A1 May 6, 2010

Related U.S. Application Data

(62) Division of application No. 11/220,830, filed on Sep. 7, 2005, now Pat. No. 7,675,352.

(51) Int. Cl.
*G06F 3/038* (2006.01)
*G09G 5/00* (2006.01)

(52) U.S. Cl. ........................................ 345/212; 345/89

(58) Field of Classification Search .................... 345/89, 345/210, 211, 690; 341/154; 327/538
See application file for complete search history.

(56) References Cited

U.S. PATENT DOCUMENTS

| | | | |
|---|---|---|---|
| 6,839,043 | B2 | 1/2005 | Nakajima |
| 2002/0097208 | A1 | 7/2002 | Hashimoto |
| 2005/0110786 | A1 | 5/2005 | Inoue |

FOREIGN PATENT DOCUMENTS

| | | | |
|---|---|---|---|
| EP | 1 335 344 | A2 | 8/2003 |
| EP | 1 335 344 | A3 | 4/2004 |
| JP | 200113478 | | 1/2001 |
| JP | 2002175033 | | 6/2002 |
| JP | 2004205896 | | 7/2004 |
| JP | 2004348122 | A | 12/2004 |
| WO | WO 2004059603 | A2 | 7/2004 |
| WO | WO 2004059603 | A3 | 7/2004 |

*Primary Examiner* — Ricardo L Osorio
(74) *Attorney, Agent, or Firm* — Winston Hsu; Scott Margo

(57) ABSTRACT

Systems and methods for generating reference voltages are provided. A representative system comprises a resistor circuit; a first switch coupled between a first end of the resistor circuit and a first power source; a second switch coupled between the first end of the resistor circuit and a second power source; a third switch coupled to a second end of the resistor circuit; a fourth switch coupled to the second end of the resistor circuit; a first resistor coupled between the first end of the resistor circuit and the first switch; a second resistor coupled between the first end of the resistor circuit and the second switch; a third resistor coupled between the second end of the resistor circuit and the third switch; a fourth resistor coupled between the second end of the resistor circuit and the fourth switch; and a control circuit for controlling the switches.

6 Claims, 8 Drawing Sheets

SYSTEMS AND METHODS FOR GENERATING REFERENCE VOLTAGES

CROSS REFERENCE TO RELATED APPLICATIONS

This application is a divisional application of U.S. patent application Ser. No. 11/220,830 filed on Sep. 7, 2005, which is herein incorporated by reference in its entirety.

BACKGROUND OF THE INVENTION

1. Field of the Invention

The present invention relates to electrical circuitry and, in particular, to systems and methods for generating reference voltages.

2. Description of the Prior Art

Active matrix liquid crystal displays (AMLCDs) are currently the leading flat-panel display technology. An AMLCD comprises a grid (or matrix) of picture elements (pixels). Thousands or millions of these pixels are used together to create an image on such a display. In a thin film transistor (TFT) panel design, TFT technology is used to build a tiny transistor switch and capacitor for each pixel in the AMLCD panel. TFTs act as switches to individually turn each pixel “on” (light) or “off” (dark). Besides the normal display mode in which an image is represented with full gradation, a display usually has several power-saving modes. For example, a display can have an n-gradation mode (where n is an integer smaller than the number of levels in full gradation) in which an image is represented with fewer gradations, a partial display mode in which only a portion of the display is used to represent an image, and/or a standby mode in which the display is turned off temporarily until being activated again.

Integrating driving (reference voltage generating) circuits into display panels using TFT technology can largely reduce display module cost. In order to have precise analog voltage control and to simplify circuit structures in the integrated reference voltage generating circuits, a conventional resistor string (R-string) approach is adopted for providing different voltages. FIG. 1 shows a prior art reference voltage generating circuit 10 disclosed in U.S. Pat. No. 6,839,043 to Nakajima, which is incorporated herein by reference. The reference voltage generating circuit 10 includes switch circuits 41 and 42, dividing resistors R1-R7, and switches SW15 and SW16. The switch circuits 41 and 42 include switches SW11, SW12 and switches SW13, SW14, respectively. The switches SW11-SW14 couple output terminals A and B of the R-string to a positive power supply Vcc and a power supply Vss, which has a lower voltage level with respect to the positive power supply Vcc. The power supplies Vcc and Vss operate at fixed periods in opposite phases for row inversion driving methodology. The dividing resistors R1 to R7 are connected in series between output terminals A and B of the R-string, with switches SW15 and SW16 interposed therebetween, respectively. Voltages V0, V7, and V1-V6 obtained by voltage division by the R-string are outputted to a digital-analog-converter (DAC).

Reference is made to FIG. 2 for a timing chart illustrating the operation of the reference voltage generating circuit 10. In the reference voltage generating circuit 10 of FIG. 1, the reference voltages V0 and V7 are both produced by connecting node A to the positive power supply Vcc and node B to the power supply Vss in a first driving period, and by connecting node B to the positive power supply Vcc and node A to the power supply Vss in a second driving period. Each such driving period alternates in a fixed interval based on control pulses $\phi$1 and $\phi$2, as shown in the timing chart of FIG. 2. Meanwhile, the reference voltages V1-V6 for intermediate gradations are produced by voltage division through the dividing resistors R1 to R7. During power-saving modes, the switches SW15 and SW16 are opened (switched off) to stop the supply of current to the dividing resistors R1-R7 based on control pulse $\phi$3. As a result, since no current flows through the dividing resistors R1-R7 and power consumption by the dividing resistors R1 to R7 is eliminated, a reduction of the power consumption can be anticipated. Although the voltage levels of V1 and V6 are represented with flat lines of zero voltage in FIG. 2 during power saving modes, the prior art reference voltage generating circuit 10 actually produces floating voltages when the R-string is disconnected from power supplies Vcc and Vss.

The prior art reference voltage generating circuit 10 has two perceived major drawbacks. First, the switches SW15 and SW16 are used to disconnect the R-string from the power sources Vcc and Vss during power-saving modes. In contrast to metal-oxide semiconductor field-effect transistors (MOSFETs), which are made on silicon wafers and use bulk-silicon as an active layer, a TFT is a transistor the active, current-carrying layer of which is a thin film (usually a film of polysilicon). Thus, the resistance of a TFT is usually much larger than that of a MOSFET. In order to achieve fast turn-on time and small voltage drop across switches for the reference voltage generating circuit 10, the switches SW15 and SW16 typically are large enough to exhibit low turn-on resistance. As a result, the reference voltage generating circuit 10 occupies a large amount of space. Second, since the R-string is disconnected from the power sources Vcc and Vss, the release voltage generating circuit 10 exhibits floating voltage levels that are outputted to the DAC during power-saving modes This tends to result in the DAC operation being non-stable and can result in more power consumption.

SUMMARY OF THE INVENTION

Systems and methods for generating reference voltages are provided.

An embodiment of such a system comprises an integrated reference voltage generating circuit comprising a resistor circuit comprising a plurality of resistors coupled in series, a first switch coupled between a first end of the resistor circuit and a first power source, a second switch coupled between the first end of the resistor circuit and a second power source, a third switch coupled to a second end of the resistor circuit, a fourth switch coupled to the second end of the resistor circuit, a first resistor coupled between the first end of the resistor circuit and the first switch, a second resistor coupled between the first end of the resistor circuit and the second switch, a third resistor coupled between the second end of the resistor circuit and the third switch, a fourth resistor coupled between the second end of the resistor circuit and the fourth switch, and a control circuit for controlling the first, second, third, and fourth switches.

Another embodiment of a system comprises an integrated reference voltage generating circuit, a multiplexer for selecting from input data obtained in different operating modes as output data of the system, a digital-to-analog controller coupled to the multiplexer and the integrated reference voltage generating circuit for processing input data of an image displayed with full gradation, and a control circuit for sending signals to the integrated reference voltage generating circuit and the multiplexer based on an operating mode of the system.

An embodiment of a method for generating reference voltages comprises providing a resistor circuit comprising a plurality of resistors coupled in series, coupling first and second ends of the resistor circuit to a same power source when displaying an image with reduced power, and coupling the first end of the resistor circuit to a first power source and the second end of the resistor circuit to a second power source when displaying an image with full gradation.

These and other objectives of the present invention will no doubt become obvious to those of ordinary skill in the art after reading the following detailed description of the preferred embodiment that is illustrated in the various figures and drawings.

DETAILED DESCRIPTION

Systems and methods for generating reference voltages are provided. Some embodiments can potentially reduce power consumption and/or compensate for charge injection effect. As such, some embodiments may be well suited for use in display systems, such as panel displays.

Figure 1:
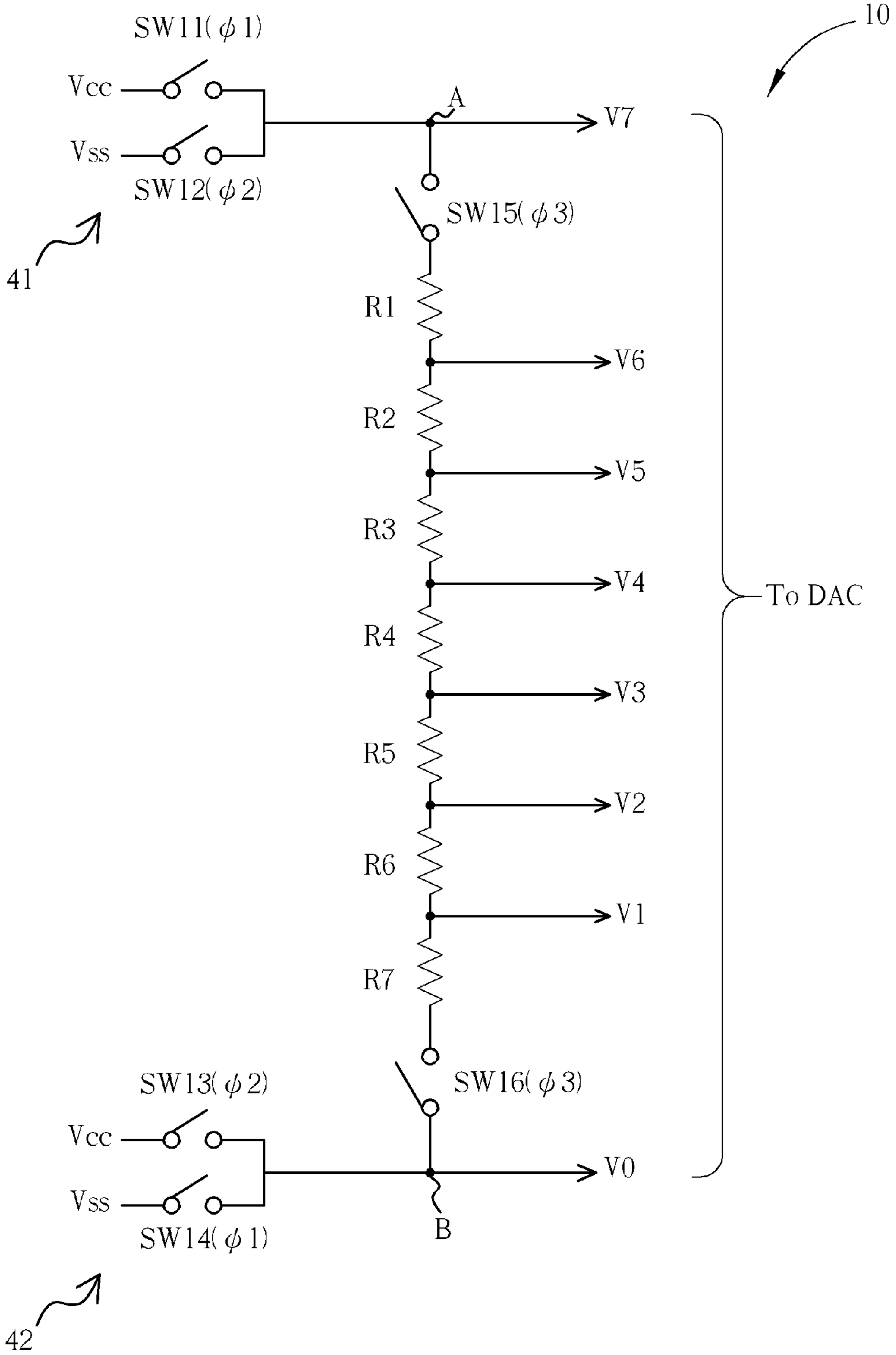
FIG. 1 PRIOR ART
FIG. 1 shows a prior art reference voltage generating circuit.
Figure 2:
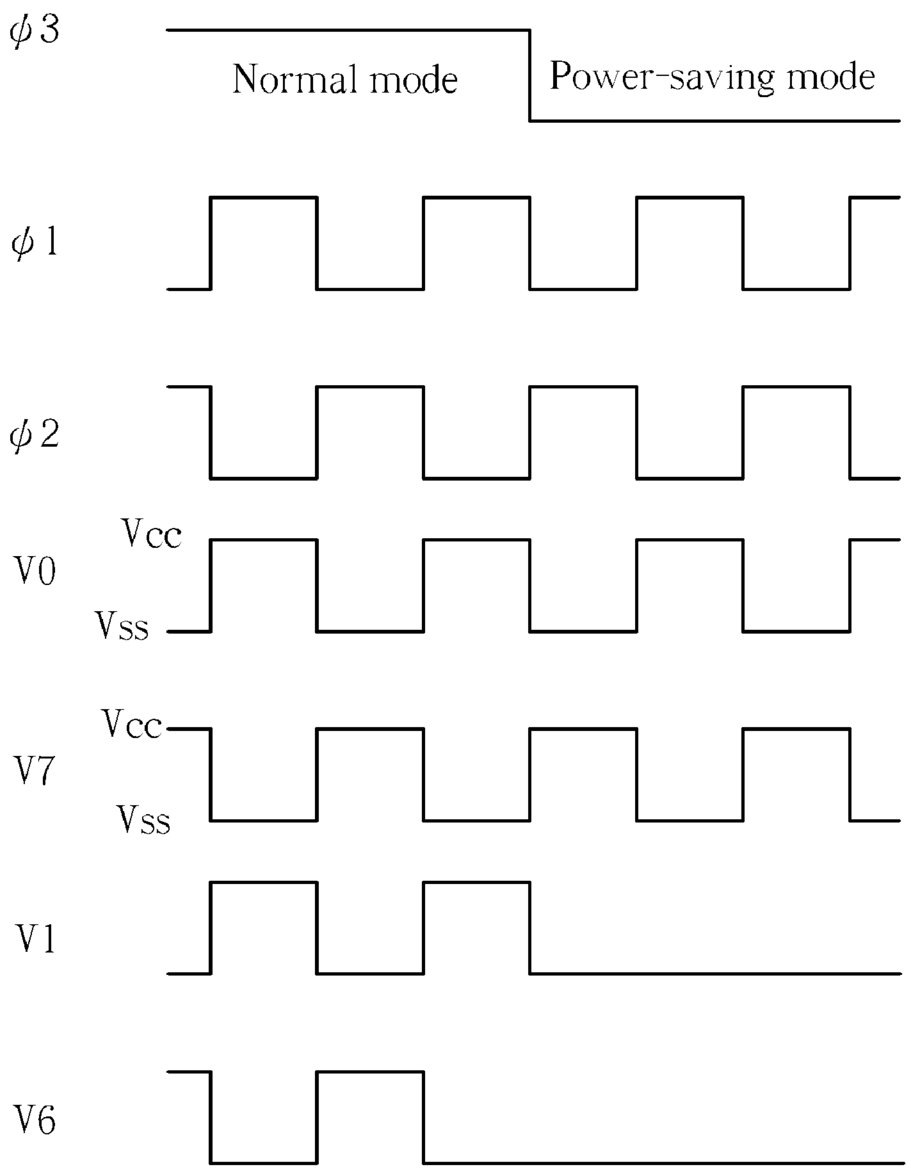
FIG. 2 PRIOR ART
FIG. 2 is a timing chart illustrating the operation of the reference voltage generating circuit in FIG. 1.
Figure 3:
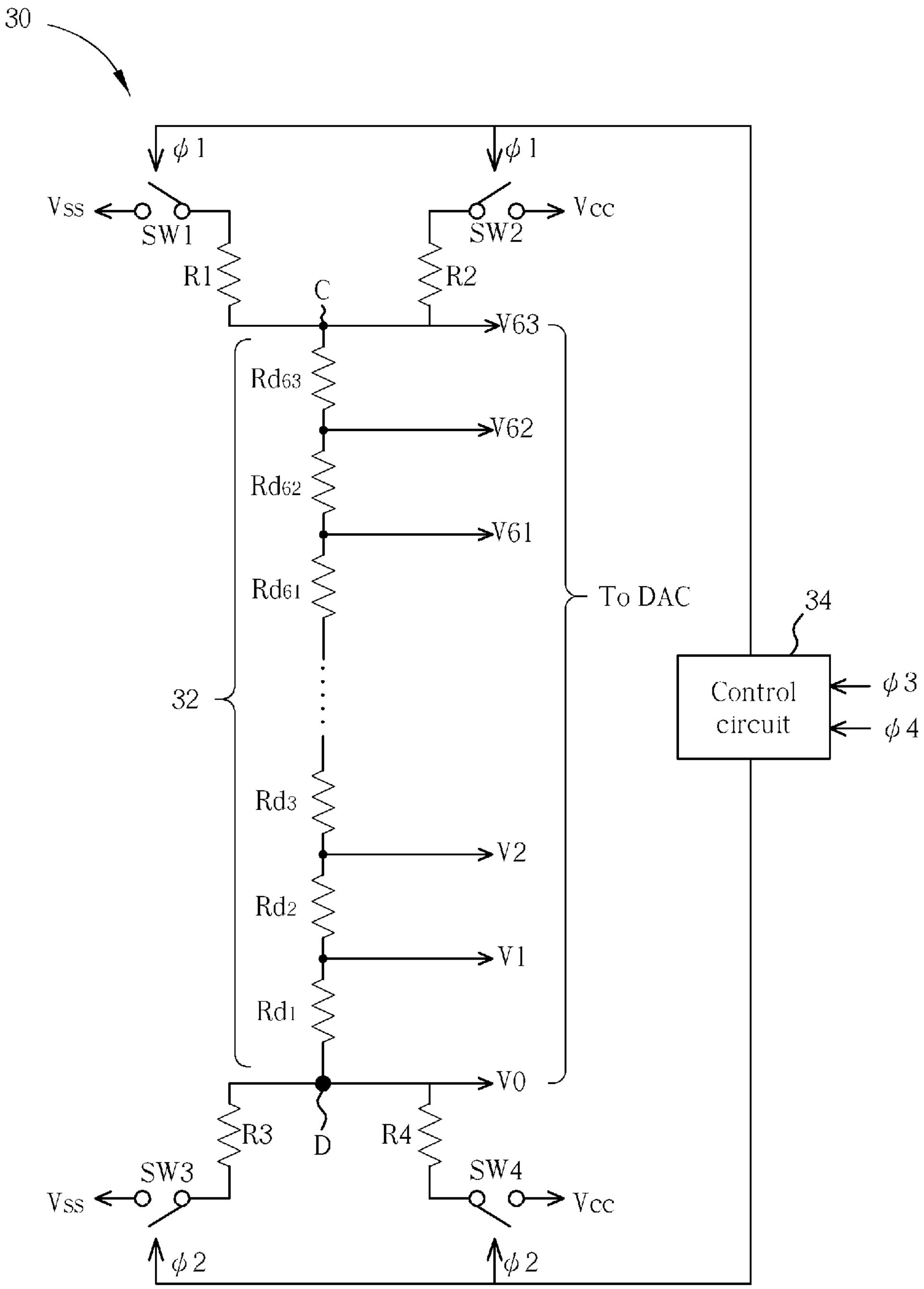
FIG. 3 shows an embodiment of an integrated reference voltage generating circuit.

In this regard, reference is made to FIG. 3 which depicts an embodiment of an integrated reference voltage generating circuit 30. The integrated reference voltage generating circuit 30 includes a resistor circuit 32, switches SW1-SW4, resistors R1-R4, voltage sources Vcc and Vss, and a control circuit 34. The power sources Vcc provide higher voltages then the power sources Vss. The resistor circuit 32 includes a plurality of dividing resistors Rd1-Rd63 coupled in series. The switch SW1 is coupled between node C of the resistor circuit 32 and the power source Vss, the switch SW2 is coupled between node C of the resistor circuit 32 and the power source Vcc, the switch SW3 is coupled between node D of the resistor circuit 32 and the power source Vss, and the switch SW4 is coupled between node D of the resistor circuit 32 and the power source Vcc. The resistor R1 is coupled between node C of the resistor circuit 32 and the switch SW1, the resistor R2 is coupled between node C of the resistor circuit 32 and the switch SW2, the resistor R3 is coupled between node D of the resistor circuit 32 and the switch SW3, and the resistor R4 is coupled between node D of the resistor circuit 32 and the switch SW4. The integrated reference voltage generating circuit 30 provides reference voltages by voltage division of the resistor circuit 32.

In the embodiment shown in FIG. 3, the integrated reference voltage generating circuit 30 provides reference voltages V0-V63 between two adjacent dividing resistors of the resistor circuit 32 The switches SW1-SW4 are turned on or off based on signals generated by the control circuit 34. The switches SW1-SW4 can be made of transistors of different doping types. For example, the switches SW1 and SW3 can be N-type transistors, and the switches SW2 and SW4 can be P-type transistors, or vice versa. If the switches SW1 and SW3 are N-type transistors and the switches SW2 and SW4 are P-type transistors, the switches SW1 and SW3 are turned on (closed circuit) and the switches SW2 and SW4 are turned off (open circuit) when receiving a control signal of "1" (high voltage level), and the switches SW1 and SW3 are turned off and the switches SW2 and SW4 are turned on when receiving a control signal of "0" (low voltage level).

Figure 4:
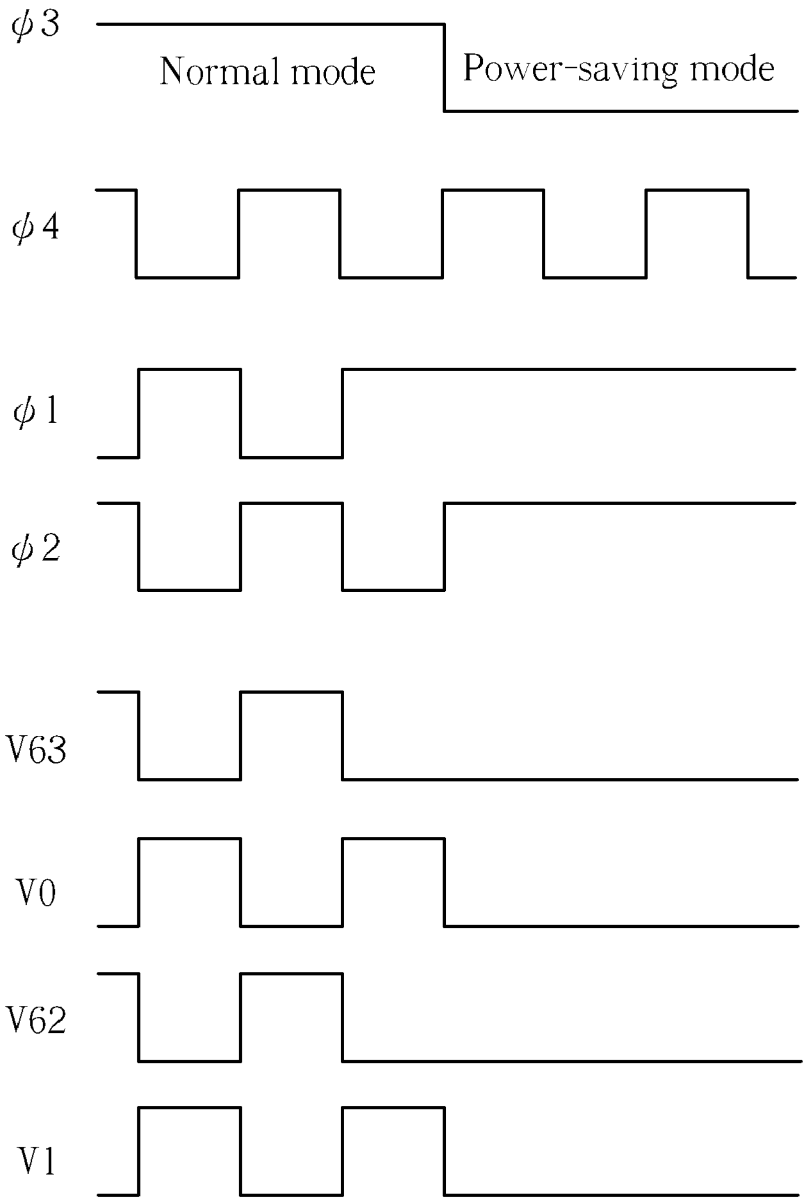
FIG. 4 is a timing chart illustrating the operation of the integrated reference voltage generating circuit in FIG. 3.

With reference to FIG. 4, the operation of the integrated reference voltage generating circuit 30 will be described. In FIG. 4, ϕ1-ϕ4 represent control pulses, each with two states: high and low. For ease of explanation, only reference voltages V0, V1, V62 and V63 are shown for illustrating the operation of the integrated reference voltage generating circuit 30 during the normal mode and the power saving modes. To prevent electroplating of ion impurity and image retention of the liquid crystal (LC) material, the polarity of the LC cell voltage is reversed on alternative intervals. The reference voltage V0 and V63 are both produced by coupling node C of the resistor circuit 32 to the power supply Vcc and node D of the resistor circuit 32 to the power supply Vss in a first driving period, and by coupling node C of the resistor circuit 32 to the power supply Vss and node D of the resistor circuit 32 to the power supply Vcc in a second driving period. Each such driving period alternates in a fixed interval based on control pulses ϕ1 and ϕ2, as shown in a timing chart of FIG. 4. In the normal display mode, the control circuit 34 provides a control pulse ϕ4 of alternating high and low levels at the fixed interval and a control pulse ϕ3 of high level, and therefore generates control pulses ϕ1 and ϕ2 for the switches SW1-SW4, as shown in FIG. 4. In the first driving interval, the resistor circuit 32 is coupled to power sources Vcc and Vss through the switches SW4 and SW1, respectively. In the second driving interval, the resistor circuit 32 is coupled to power sources Vcc and Vss through the switches SW2 and SW3, respectively. Intermediate reference voltages V1-V62 are generated by voltage division by the dividing resistors Rd1-Rd63 of the resistor circuit 32.

During the power-saving mode, the control pulse ϕ3 switches to low level and the control pulse ϕ4 remains unchanged as in the normal mode, thereby generating the control signals ϕ1 and ϕ2 each having a high level. Consequently, the switches SW2 and SW4 are turned off, disconnecting the resistor circuit 32 from the power source Vcc. At the same time, the switches SW1 and SW3 are turned on, coupling the resistor circuit 32 to the power source Vss. Therefore, during the power-saving mode, no current flows through the resistor circuit 32 and the power consumption from the diving resistors can be reduced. Although no current flows through the resistor circuit 32, both ends of the resistor circuit 32 are still coupled to Vss during the power-saving mode. In contrast to floating voltages of the prior art reference voltage generating circuit 10, the voltage of the entire resistor circuit 32 is fixed to Vss during the power saving mode thereby shutting down DAC operation in a stable way. Therefore, the integrated reference voltage generating circuit 30 can reduce power consumption without occupying large circuit space and without influencing the stability of the DAC during power-saving mode.

Figure 5:
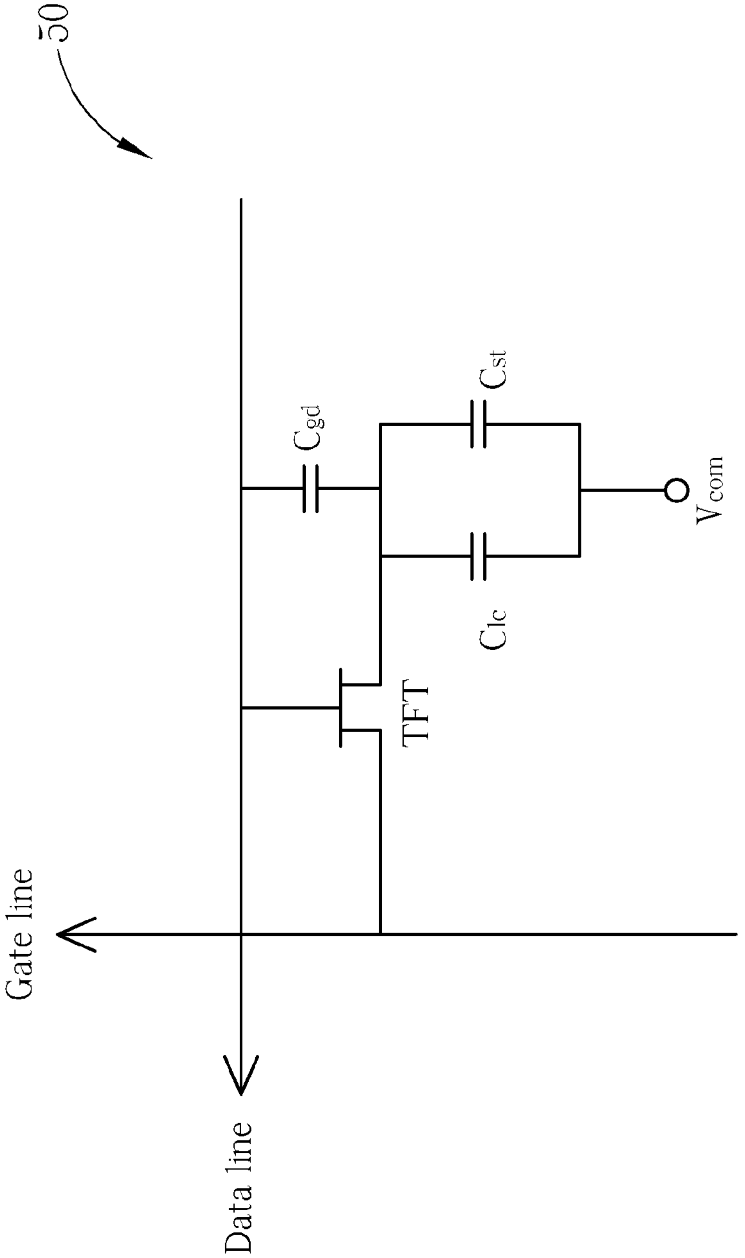
FIG. 5 PRIOR ART
FIG. 5 shows an equivalent circuit of a prior art pixel.

FIG. 5 is a diagram showing an equivalent circuit of a pixel 50. The pixel 50 includes a TFT for turning on and off the pixel 50, a storage capacitor Cst for data storage, and a liquid crystal capacitor Clc representing the capacitance of the liquid crystal material. Data sent to the pixel 50 is stored in the capacitors Cst and Clc. The parasitic capacitance of the pixel 50 is represented by a parasitic capacitor Cgd. A signal from a gate line turns on the TFT, allowing data sent from a data line to be stored in the capacitors Cst and Clc. Usually reference voltages generated by an integrated reference voltage generating circuit are sent to a DAC, which in turn selects a voltage from the reference voltages and sends the selected voltage to the data line.

Figure 6:
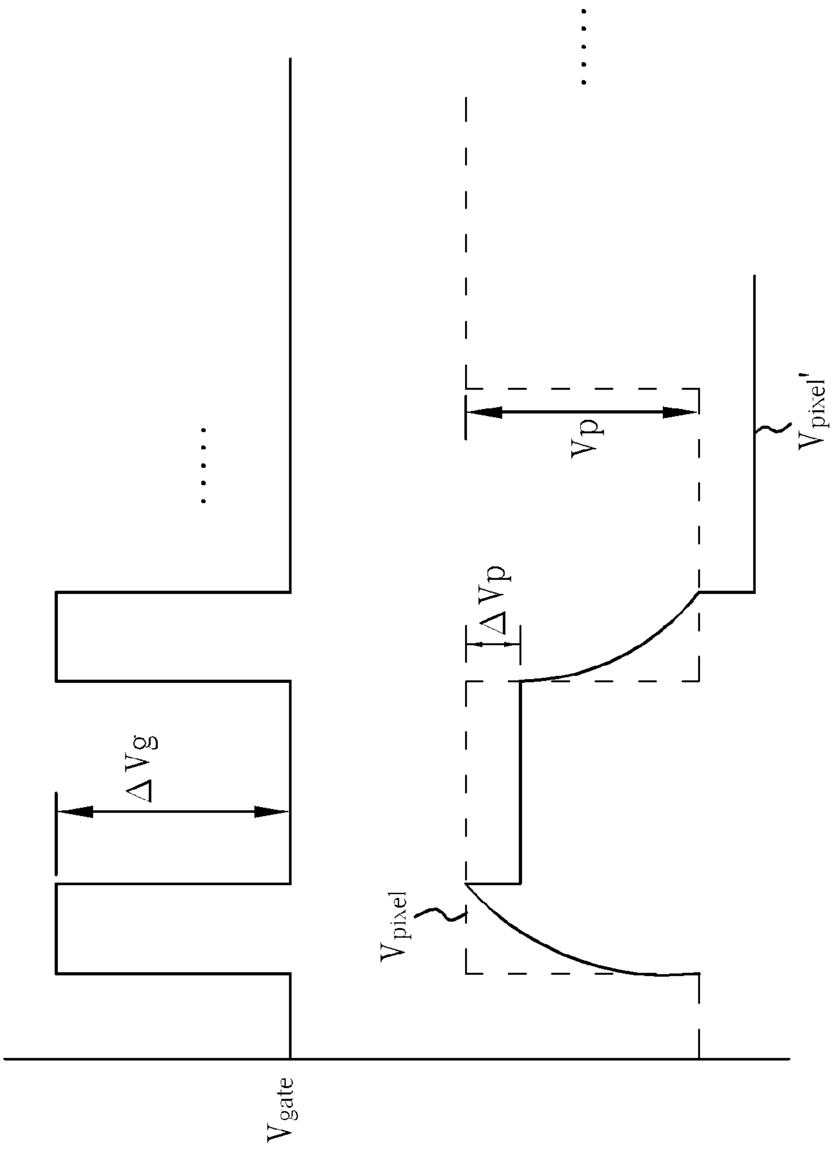
FIG. 6 PRIOR ART
FIG. 6 shows a graph illustrating the charge-injection effect.

The charge-injection effect is a phenomenon of level change caused by stray capacitance represented by the parasitic capacitor Cgd. In this regard, FIG. 6 is a diagram illustrating the charge-injection effect. In FIG. 6, Vgate represents the voltage sent to the gate line, Vpixel (dashed line) represents the ideal voltage obtained across the capacitors Cst and Clc if a voltage of Vp is sent to the data line and Vpixel' represents the actual voltage obtained across the capacitors Cst and Clc if a voltage of Vp is sent to the data line. Due to charge-injection effect, Vpixel' differs from Vpixel in that it suffers a voltage drop ΔVp, potentially causing loss of data stored in the capacitors Cst and Clc. The voltage drop ΔVp is represented as follows:

$$\Delta Vp = \Delta Vg \times \frac{Cgd}{Cgd + Clc + Cs}$$

Embodiments of an integrated reference voltage generating circuit, such as circuit 30, can potentially compensate for the charge-injection effect using the resistors R1-R4. Based on capacitance of the capacitors Cst, Clc and Cgd, the voltage drop ΔVp can be calculated. Through the resistors R1-R4, different voltages can therefore be provided at both ends of the resistor circuit 32 for compensating for the voltage drop ΔVp. The resistance of the resistors R1-R4 depends on the value of ΔVp. In the integrated reference voltage generating circuit 30 of the present invention, the resistors R1 and R4 have the same resistance, and the resistors R2 and R3 have the same resistance.

Figure 7:
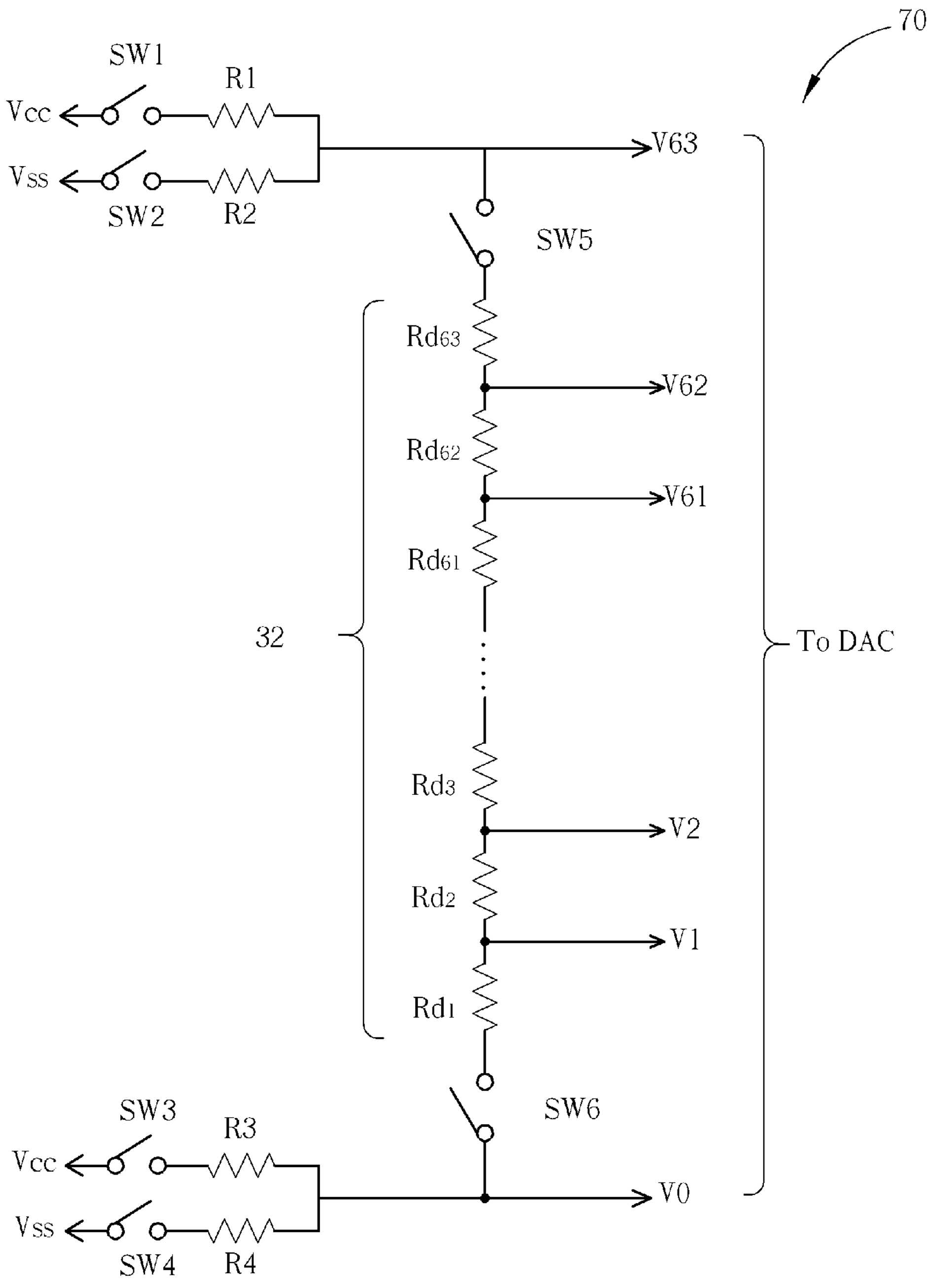
FIG. 7 shows an integrated reference voltage generating circuit according to a second embodiment of the present invention.

FIG. 7 is another embodiment of an integrated reference voltage generating circuit 70. The integrated reference voltage generating circuit 70 includes a resistor circuit 32, switches SW1-SW4, resistors R1-R4, voltage sources Vcc and Vss, and a control circuit 34. The power sources Vcc provide higher voltages then the power sources Vss. The resistor circuit 32 includes a plurality of dividing resistors Rd1-Rd63 coupled in series. Notably, the integrated reference voltage generating circuit 70 differs from the prior art voltage generating circuit 10, at least in one respect, in that it includes resistors R1-R4 for compensating for the charge-injection effect.

Figure 8:
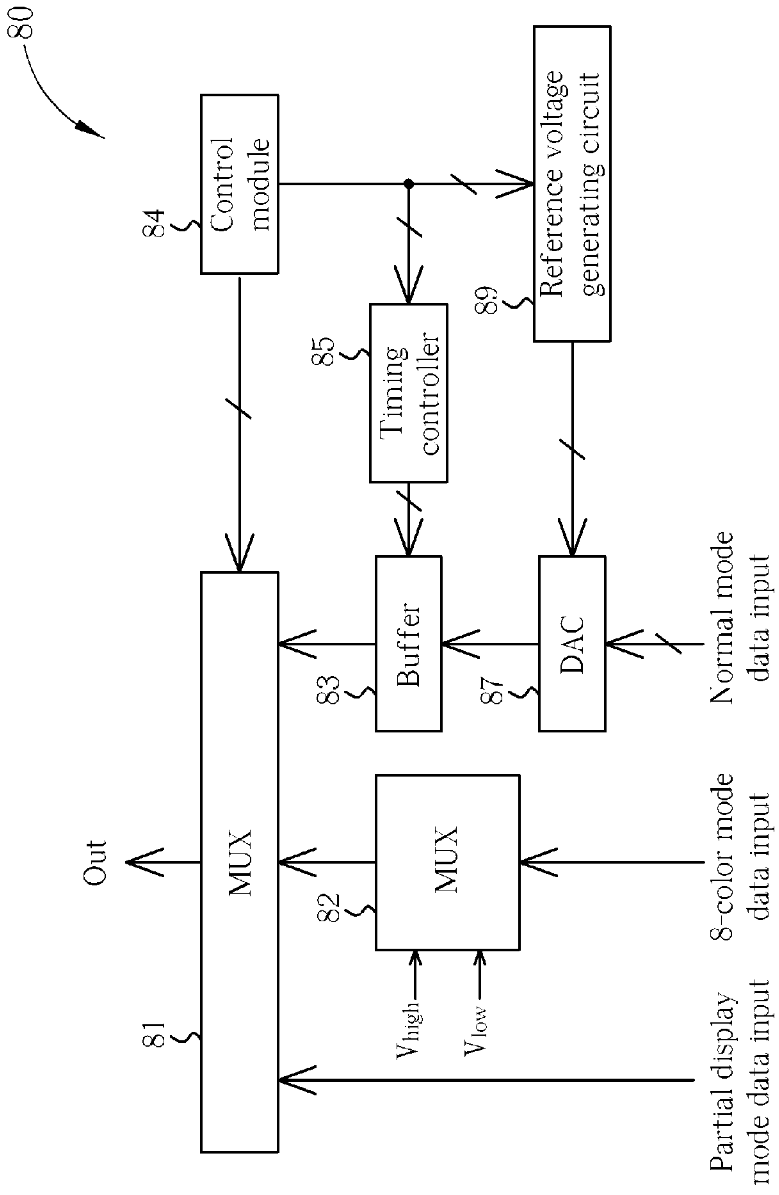
FIG. 8 is a functional block diagram of an embodiment of a display system incorporating an embodiment of an integrated reference voltage generating circuit.

FIG. 8 is a schematic diagram of an embodiment of a display system 80 incorporating embodiments of integrated reference voltage generating circuit. The display system 80 of FIG. 8 includes MUX devices 81 and 82, a buffer 83, a control module 84, a timing controller 85, a DAC 87 and a reference generating circuit 89. The reference generating circuit 89 could be configured as the integrated reference generating circuits 30 and 70 shown in FIGS. 3 and 7, for example, for providing reference voltages to the DAC 87. Based on signals sent from the control module 84, the MUX device 81 selects from partial display mode input data, 8-color mode input data or normal mode input data as output data. When operating in normal mode, the reference generating circuit 89 performs voltage division and provides the DAC 87 a plurality of reference voltages. The MUX device 81 then selects the normal mode input data having been processed by the DAC 87 and the buffer 83 as the output data. When operating in power-saving modes, such as partial display mode and 8-color mode, the resistor circuit adopted in the reference generating circuit 89 either has both ends coupled to a power source (such as when using the integrated reference generating circuits 30) or disconnected from a power source (such as when using the integrated reference generating circuits 70). The MUX device 81 then selects the partial display mode input data or the 8-color mode input data as the output data.

Integrated reference voltage generating circuits can potentially occupy less circuit space than prior art structures.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A method for generating reference voltages comprising:
- providing a resistor circuit comprising a plurality of resistors coupled in series;
- coupling a first end of the resistor circuit to a first power source by applying a first control signal and coupling a second end of the resistor circuit to the first power source by applying a second control signal when displaying an image with reduced power; and
- coupling the first end of the resistor circuit to the first power source by applying the first control signal and coupling the second end of the resistor circuit to a second power source by applying the second control signal when displaying an image with full gradation.

2. The method of claim 1 wherein coupling first and second ends comprises coupling the first and second ends of the resistor circuit to a negative voltage source when displaying an image with reduced power.

3. The method of claim 1 wherein coupling the first end comprises coupling the first end of the resistor circuit to a positive voltage source and the second end of the resistor circuit to a negative voltage when displaying an image with full gradation.

4. The method of claim 1 wherein coupling the first end comprises coupling the first end of the resistor circuit to the first power source through a first resistor and the second end of the resistor circuit to the second power source through a second resistor when displaying an image with full gradation for compensating for a charge-injection effect.

5. The method of claim 4 wherein coupling the first end comprises coupling the first end of the resistor circuit to a positive voltage source through the first resistor and the second end of the resistor circuit to a negative voltage through the second resistor when displaying an image with full gradation.

6. The method of claim 1 further comprising providing a voltage established between two adjacent resistors of the resistor circuit to a digital-to-analog controller.

* * * * *